United States Patent
Heckendorf et al.

(10) Patent No.: US 8,493,842 B2
(45) Date of Patent: Jul. 23, 2013

(54) IMPLEMENTING EXCHANGE OF FAILING LANE INFORMATION FOR FAULT-TOLERANT COMMUNICATION LINKS

(75) Inventors: Ryan Abel Heckendorf, Rochester, MN (US); Kerry Christopher Imming, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/884,547

(22) Filed: Sep. 17, 2010

(65) Prior Publication Data
US 2012/0069734 A1    Mar. 22, 2012

(51) Int. Cl.
*G06F 11/00* (2006.01)

(52) U.S. Cl.
USPC ............ 370/225; 370/252; 370/419; 370/465

(58) Field of Classification Search
None
See application file for complete search history.

(56) References Cited

U.S. PATENT DOCUMENTS

| | | | |
|---|---|---|---|
| 4,654,841 A * | 3/1987 | Ekberg | 370/222 |
| 7,382,790 B2 * | 6/2008 | Warren et al. | 370/401 |
| 2004/0085994 A1 * | 5/2004 | Warren et al. | 370/462 |

\* cited by examiner

*Primary Examiner* — Chi Pham
*Assistant Examiner* — Shick Hom
(74) *Attorney, Agent, or Firm* — Joan Pennington

(57) ABSTRACT

A method and circuit for implementing exchange of failing lane information for fault-tolerant communication links, and a design structure on which the subject circuit resides are provided. An ordered set for lane and link training includes a novel lane mask field for lane and link training. Ordered sets are exchanged during lane and link training for a fault-tolerant communication link to establish synchronization between a transmitter and a receiver. In a link training step, the bus link layer exchanges an ordered set with a plurality of bits of lane mask information included in predefined bytes, such as bytes 8 and 9 of the lane mask field. Upon receiving the ordered set with the plurality of bits of lane mask information, the transmitter lanes are reconfigured to align with the received mask information.

17 Claims, 6 Drawing Sheets

200

| | LANES PER DATA LINK |
|---|---|
| PHYSICAL | 12 |
| NORMAL | 10 |
| DEGRADED | 9,8 |
| MINIMUM | 8 |

FIG. 2

| BYTES 302 | TSE 304 |
|---|---|
| 0 | COM |
| 1 | LANE_ID |
| 2 | D5.2 |
| 3 | D5.2 |
| 4 | D5.2 |
| 5 | D5.2 |
| 6 | D5.2 |
| 7 | D5.2 |
| 8 | MASK(0:7) |
| 9 | MASK(8:15) |
| 10 | D5.2 |
| 11 | D5.2 |
| 12 | D5.2 |
| 13 | D5.2 |
| 14 | D5.2 |
| 15 | D5.2 |
| 16:31 | D5.2 |

IMPLEMENTING EXCHANGE OF FAILING LANE INFORMATION FOR FAULT-TOLERANT COMMUNICATION LINKS

STATEMENT REGARDING FEDERALLY SPONSORED RESEARCH OR DEVELOPMENT

This invention was made with Government support under Contract No. HR0011-07-9-0002 awarded by the Department of Defense. The Government has certain rights in this invention.

FIELD OF THE INVENTION

The present invention relates generally to the data processing field, and more particularly, relates to a method and circuit for implementing exchange of failing lane information for fault-tolerant communication links, and a design structure on which the subject circuit resides.

DESCRIPTION OF THE RELATED ART

Some bus interfaces provide continued operation after a bit lane fails, where a bus, or link, is made up of a number of bit lanes, but known bus interface arrangements typically support only a limited subset of configurations.

Today one system has a requirement to continue operating with all remaining available lanes independent of which lanes are bad. When an arbitrary set of failing lanes must be tolerated, hardware must configure and use as many lanes as possible.

A need exists for an effective mechanism for implementing exchange of failing lane information for fault-tolerant communication links. It is desirable to provide such mechanism for implementing exchange of failing lane information for fault-tolerant communication links that is a hardware-efficient arrangement.

SUMMARY OF THE INVENTION

Principal aspects of the present invention are to provide a method and circuit for implementing exchange of failing lane information for fault-tolerant communication links, and a design structure on which the subject circuit resides. Other important aspects of the present invention are to provide such method and circuit substantially without negative effects and that overcome many of the disadvantages of prior art arrangements.

In brief, a method and circuit for implementing exchange of failing lane information for fault-tolerant communication links, and a design structure on which the subject circuit resides are provided. An ordered set for lane and link training includes a novel lane mask field for lane and link training. Ordered sets are exchanged during lane and link training for a fault-tolerant communication link to establish synchronization between a transmitter and a receiver. In a link training step, the bus link layer exchanges an ordered set with a plurality of bits of lane mask information included in predefined bytes, such as bytes 8 and 9 of the lane mask field. Upon receiving the ordered set with the plurality of bits of lane mask information, the transmitter lanes are reconfigured to align with the received mask information.

In accordance with features of the invention, the lane mask information is learned in the link training process, and stored in a lane mask register. Data is transmitted over good lanes, using the stored lane mask register information.

In accordance with features of the invention, an identified set of good lanes includes either a standard or reversed lane configuration. Allowing the reversed lane configuration permits the lanes in a link to be reversed to allow board wiring to be more efficient by not having to cross-over or swap the lanes, and to handle a mis-wired optical cable.

In accordance with features of the invention, the predefined bytes include, for example, two optical bus symbols to gather the full lane fail mask. Hardware gathers the full lane fail mask into a full 16-bit value prior to applying the mask to the transmitter.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 illustrates an example 'lanes per link' summary for fault-tolerant communication links in accordance with the preferred embodiment;

FIG. 3 illustrates an example control ordered set for implementing exchange of failing lane information for fault-tolerant communication links in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and a circuit for implementing exchange of failing lane information for fault-tolerant communication links, and a design structure on which the subject circuit resides are provided. An ordered set of the invention includes a novel lane mask field for lane and link training. The ordered set of the invention provides an enhanced TS2 ordered set that includes the Lane Mask field. Ordered sets are exchanged during lane and link training to establish synchronization between the transmitter and receiver. In a step in link training for a fault-tolerant communication link, the bus link layer exchanges an ordered set with a plurality of bits, such as 16 bits of lane mask information included in predefined bytes, such as bytes 8 and 9 of the ordered set. Upon receiving the ordered set, the transmitter reconfigures its lanes to align with the received mask information.

Figure 1:
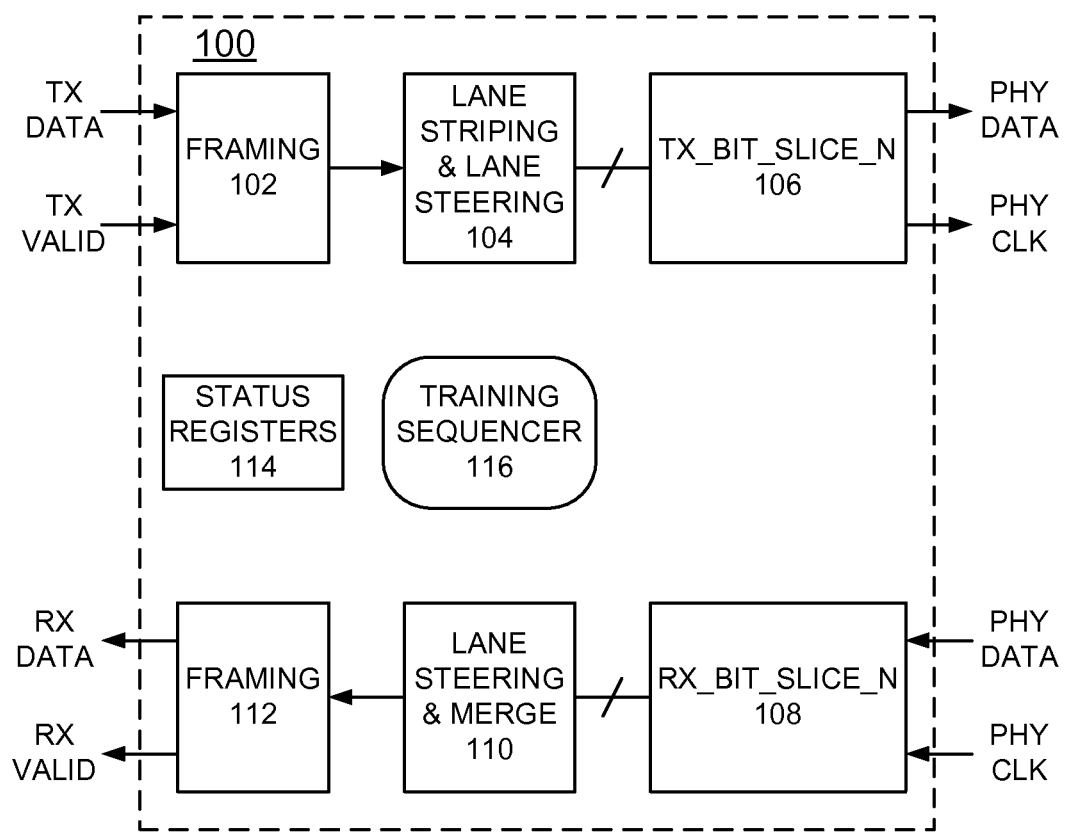
FIG. 1 is a block diagram representation illustrating a circuit for implementing exchange of failing lane information for fault-tolerant communication links in accordance with the preferred embodiment.

Having reference now to the drawings, in FIG. 1, there is shown an example circuit generally designated by the reference character 100 for implementing exchange of failing lane information for fault-tolerant communication links in accordance with the preferred embodiment. Circuit 100 is an optical link layer (OLL) unit for implementing exchange of failing lane information between a transmitter and a receiver attached to fault-tolerant optical communication links in accordance with the preferred embodiment.

Circuit 100 includes a framing block 102 receiving transmit TX data and TX valid inputs coupled to a lane striping and lane steering block 104 coupling serial transmit slices (TX_BIT_SLICE_N) 106 providing serial slices to a parallel bus indicated by PHY DATA, and PHY CLK. Circuit 100 includes serial receive slices (RX_BIT_SLICE_N) 108 receiving data from the parallel bus indicated by PHY DATA, and PHY CLK. A lane steering and merge block 110 couples serial receive slices to a framing block 112. Circuit 100 includes status registers 114 for storing lane mask information, and a training sequencer 116 for implementing link training processes in accordance with the preferred embodiment. The lane mask information stored in a fail mask in status registers 114 identifies bad lanes, which are identified during link training.

Referring also to FIG. 2, there is shown an example 'lanes per link' summary generally designated by the reference character 200 for fault-tolerant communication links in accordance with the preferred embodiment. For example, each physical link can include 12 lanes per data link including normal mode operation of 10 lanes per data link. Degraded mode operation includes 8 or 9 lanes per data link, with a minimum of 8 lanes per data link.

Referring to FIG. 3, there is shown an example format for control ordered sets generally designated by the reference character 300 for implementing exchange of failing lane information for fault-tolerant communication links in accordance with the preferred embodiment. The example ordered set 300 for lane and link training includes a plurality of defined bytes 302 corresponding to symbols 304, such as an enhanced TS2 ordered set including a novel lane mask field for lane and link training indicated at predefined bytes 302, 8 and 9 respectively labeled MASK (0:7) and MASK (8:15).

Ordered sets are exchanged during lane and link training for a fault-tolerant communication link to establish synchronization between a transmitter and a receiver. In a final link training step, the bus link layer exchanges an ordered set 300 with a plurality of bits MASK (0:7) and MASK (8:15) of lane mask information.

In accordance with features of the invention, a set of good lanes is identified from MASK symbols, each containing one byte of lane mask information. The identified set of good lanes includes either a standard or reversed lane configuration. Allowing the reversed lane configuration permits the lanes in a link to be reversed to allow board wiring to be more efficient by not having to cross-over or swap the lanes, and to handle a mis-wired optical cable.

Figure 4A:
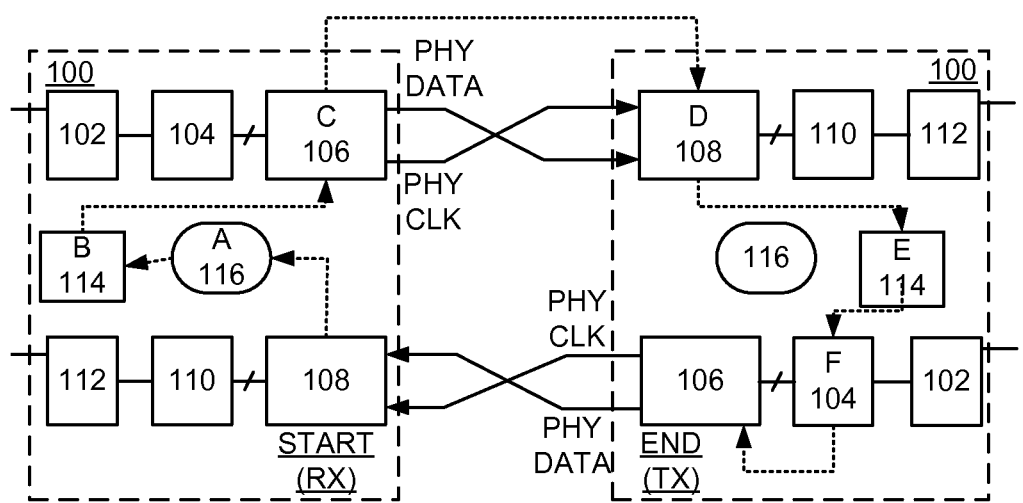
FIGS. 4A and 4B illustrate example flow logic of the circuit of FIG. 1 for implementing exchange of failing lane information for fault-tolerant communication links in accordance with the preferred embodiment.
Figure 4B:
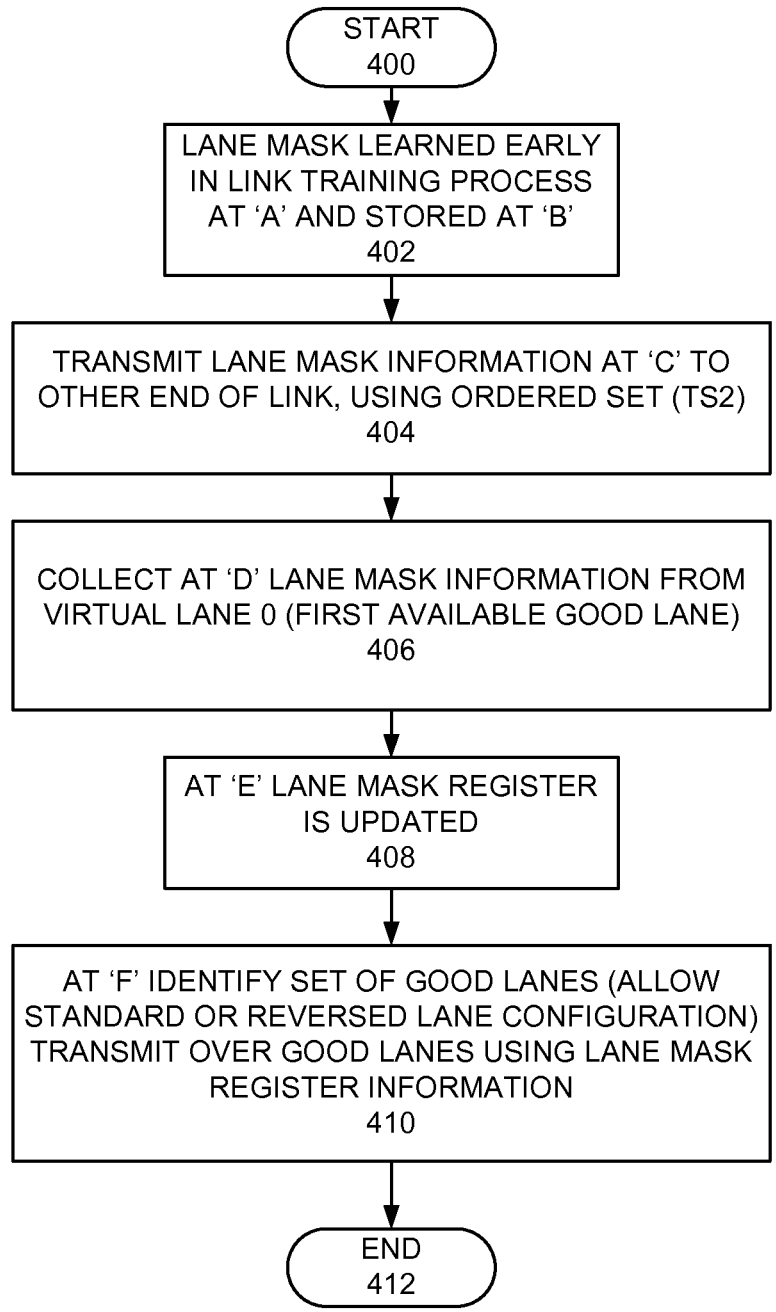

Referring to FIGS. 4A and 4B, there is shown example flow logic with paths shown in dotted line in the circuit 100 of FIG. 1 for implementing exchange of failing lane information for fault-tolerant communication links in accordance with the preferred embodiment.

Exchange of failing lane information for fault-tolerant communication links in accordance with the preferred embodiment begins as indicated by START (RX) in FIG. 4A and starting at block 400 in FIG. 4B. As indicated at step A in the training sequencer 116, lane mask information is learned early in the link training process and stored at step B in the status registers 114 as indicated at a block 402.

Ordered sets are exchanged during lane and link training to establish synchronization between the transmitter and receiver. For example, as a final step in link training, the bus link layer exchanges the ordered set 300 with 16 bits of lane mask information included in bytes 8 and 9 of the ordered set.

Next as indicated at step C in the serial transmit slice block (TX_BIT_SLICE_N) 106, lane mask information is transmitted to the other end of the link, using the enhanced ordered set 300 of the invention as indicated at a block 404. The lane mask information is collected from the first virtual lane 0, which is the first good lane, as indicated at step D in the receive slice block (RX_BIT_SLICE_N) 108 at the other end of the link and as indicated at a block 406.

Upon receiving the ordered set, the transmitter reconfigures its lanes to align with the received mask information. The lane mask register is updated as indicated at step E in the status registers 114 and as indicated at a block 408.

A set of good lanes is identified, using a standard or reversed lane configuration, and data is transmitted from the transmit end as indicated by END (TX) over good lanes, using the lane mask register information as indicated at step F in the serial transmit slice block (TX_BIT_SLICE_N) 106 and as indicated at a block 410.

The process ends as indicated at a block 412. The same process is provided for data traveling in the opposite direction as shown in FIG. 4A.

Figure 5:
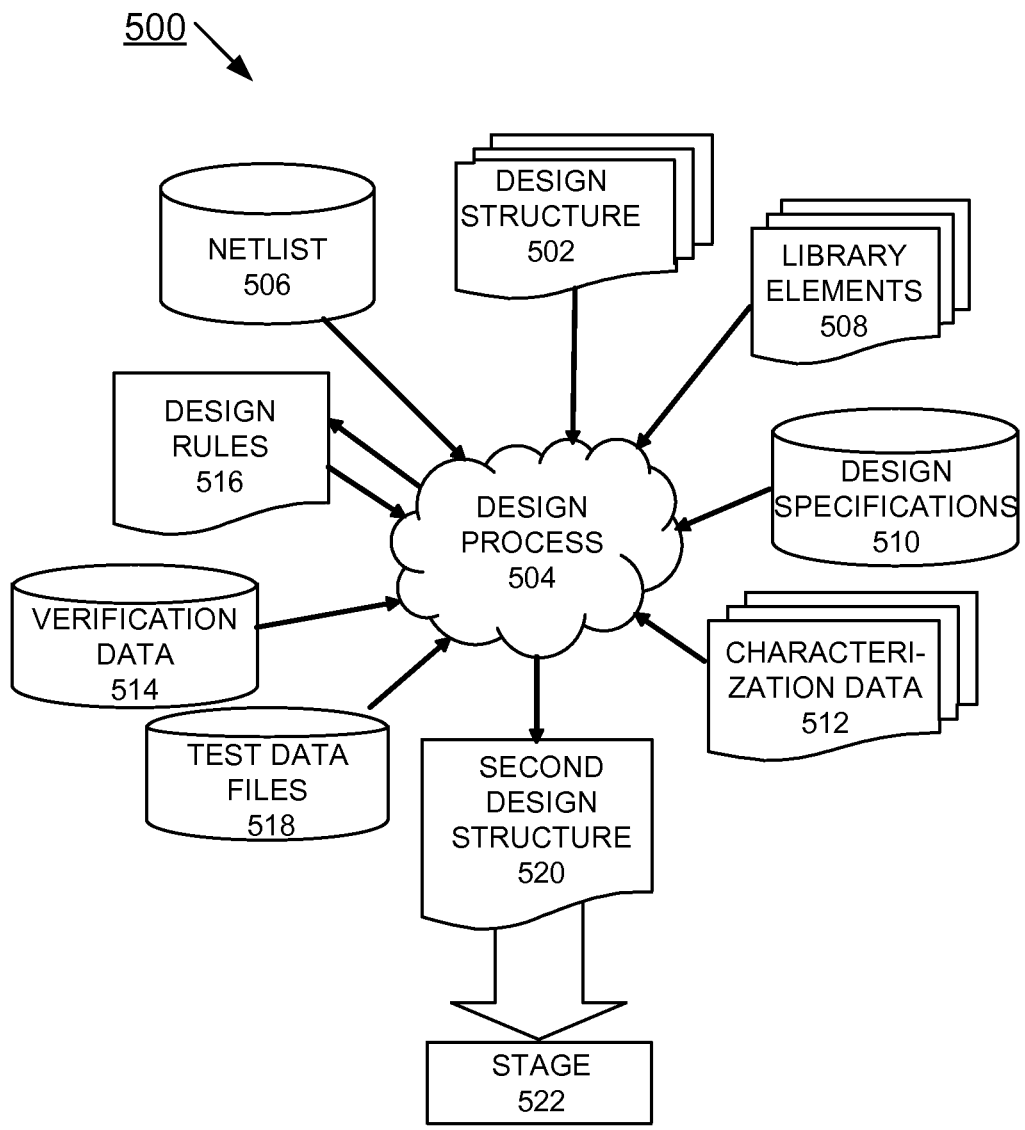
FIG. 5 is a flow diagram of a design process used in semiconductor design, manufacturing, and/or test.

FIG. 5 shows a block diagram of an example design flow 500. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuit 100 in the form of schematics or HDL, a hardware-description language, for example, Verilog, VHDL, C, and the like. Design structure 502 may be contained on one or more machine readable medium. For example, design structure 502 may be a text file or a graphical representation of circuit 100. Design process 504 preferably synthesizes, or translates, circuit 100, and circuit 300 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuit.

Design process 504 may include using a variety of inputs; for example, inputs from library elements 508 which may house a set of commonly used elements, circuits, and devices, including models, layouts, and symbolic representations, for a given manufacturing technology, such as different technology nodes, 32 nm, 45 nm, 90 nm, and the like, design specifications 510, characterization data 512, verification data 514, design rules 516, and test data files 518, which may include test patterns and other testing information. Design process 504 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 504 preferably translates an embodiment of the invention as shown in FIGS. 1, 2, 3 and 4 along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2, 3 and 4. Design structure 520 may then proceed to a stage 522 where, for example, design structure 520 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing exchange of failing lane information for fault-tolerant communication links comprising:
   providing a lane mask field in an ordered set for lane and link training;
   exchanging ordered sets during lane and link training to establish synchronization between a transmitter and a receiver;
   exchanging said ordered set with a plurality of bits of lane mask information included in predefined bytes of the lane mask field in a link training process;
   responsive to receiving the ordered set with the plurality of bits of lane mask information, reconfiguring transmitter lanes to align with received lane mask information;
   learning the lane mask information in the link training process; and
   storing the lane mask information in a lane mask register.

2. The method as recited in claim 1 includes providing a bus link layer exchanging said ordered set with a plurality of bits of lane mask information included in predefined bytes of the lane mask field.

3. The method as recited in claim 1 further includes identifying and transmitting data over good lanes using the received lane mask information.

4. The method as recited in claim 3 wherein identifying and transmitting data over good lanes using the received lane mask information includes identifying a standard or reversed lane configuration of good lanes.

5. The method as recited in claim 1 further includes providing the plurality of bits of lane mask information into two optical bus symbols including a full lane fail mask.

6. A circuit for implementing exchange of failing lane information for fault-tolerant communication links comprising:
   an ordered set used for lane and link training including a lane mask field;
   a transmitter and a receiver exchanging ordered sets during lane and link training to establish synchronization between said transmitter and said receiver;
   said transmitter and said receiver exchanging said ordered set with a plurality of bits of lane mask information included in predefined bytes of the lane mask field in a link training process;
   said transmitter and said receiver responsive to receiving the ordered set with the plurality of bits of lane mask information, reconfiguring transmitter lanes to align with received lane mask information; and
   said transmitter and said receiver including a training sequencer learning lane mask information in the link training process, and a lane mask register storing the lane mask information.

7. The circuit as recited in claim 6 includes said transmitter and said receiver identifying and transmitting data over good lanes using the received lane mask information.

8. The circuit as recited in claim 6 wherein said transmitter and said receiver identifying a standard or reversed lane configuration of good lanes using the received lane mask information.

9. The circuit as recited in claim 6 wherein said ordered set used for lane and link training including said lane mask field includes two optical bus symbols including a full lane fail mask information included in the plurality of bits of lane mask information.

10. The circuit as recited in claim 9 wherein said transmitter and said receiver include hardware collecting said two optical bus symbols including said full lane fail mask information, and defining said ordered set used for lane and link training including said lane mask field.

11. A design structure embodied in a non-transitory machine readable storage medium used in a design process, the design structure comprising:
    a circuit tangibly embodied in the non-transitory machine readable storage medium used in the design process, said circuit for implementing exchange of failing lane information for fault-tolerant communication links, said circuit comprising:
    an ordered set used for lane and link training including a lane mask field;
    a transmitter and a receiver exchanging ordered sets during lane and link training to establish synchronization between said transmitter and said receiver;
    said transmitter and said receiver exchanging said ordered set with a plurality of bits of lane mask information included in predefined bytes of the lane mask field in a link training process;
    said transmitter and said receiver responsive to receiving the ordered set with the plurality of bits of lane mask information, reconfiguring transmitter lanes to align with received lane mask information, the design structure, and
    said transmitter and said receiver including a training sequencer learning the lane mask information in the link training process, and a lane mask register storing the lane mask information, when read and used in the manufacture of a semiconductor chip produces a chip comprising said circuit.

12. The design structure of claim 11, wherein the design structure comprises a netlist, which describes said circuit.

13. The design structure of claim 11, wherein the design structure resides on storage medium as a data format used for the exchange of layout data of integrated circuits.

14. The design structure of claim 13, wherein the design structure includes at least one of test data files, characterization data, verification data, or design specifications.

15. The design structure of claim 11, includes said transmitter and said receiver identifying a standard or reversed lane configuration of good lanes using the received lane mask information.

16. The design structure of claim 11, wherein said ordered set used for lane and link training including a lane mask field includes two optical bus symbols including a full lane fail mask information included in the plurality of bits of lane mask information.

17. The design structure of claim 11, wherein includes said transmitter and said receiver identifying and transmitting data over good lanes using the received lane mask information.

* * * * *